United States Patent [19]

Flynn

[11] Patent Number: 5,870,685
[45] Date of Patent: Feb. 9, 1999

[54] MOBILE STATION OPERATIONS MANAGEMENT BASED ON BATTERY CAPACITY

[75] Inventor: James M. Flynn, Raleigh, N.C.

[73] Assignee: Ericsson Inc., Research Triangle Park, N.C.

[21] Appl. No.: 706,519

[22] Filed: Sep. 4, 1996

[51] Int. Cl.$^6$ ...................................................... H04B 1/40
[52] U.S. Cl. ........................ 455/573; 455/38.3; 455/127; 455/343; 455/435; 320/128; 320/136
[58] Field of Search .................................. 455/343, 127, 455/572–574, 567, 566, 403, 435, 38.3; 320/134, 135, 136, 128, 127

[56] References Cited

U.S. PATENT DOCUMENTS

| | | | |
|---|---|---|---|
| 4,734,635 | 3/1988 | Theobald | 320/13 |
| 5,142,563 | 8/1992 | Nyuu et al. | 379/61 |
| 5,278,995 | 1/1994 | Hwang | 455/127 |
| 5,475,735 | 12/1995 | Williams et al. | 455/403 |
| 5,627,528 | 5/1997 | Kuznicki | 340/825.44 |

FOREIGN PATENT DOCUMENTS 0 394 074  10/1990  European Pat. Off. .
164480    6/1994   Japan .
0884370   3/1996   Japan .

OTHER PUBLICATIONS

"Smart Batteries", *Electronics World and Wireless World*, vol. 102, No. 1722, pp. 374–375, XP 000597307 (May 1996).

Mouly, M. et al., "The GSM System", *GSM System for Mobile Communications*, pp. 466–477 (1992).

*Primary Examiner*—Wellington Chin
*Assistant Examiner*—Lee Nguyen
*Attorney, Agent, or Firm*—Robert A. Samra

[57] ABSTRACT

The present invention provides a method and apparatus for controlling the operations of a battery-powered mobile station based on the capacity of its battery. In accordance with the present invention, the mobile station monitors the capacity of its battery to determine whether it has fallen below any one of a plurality of threshold capacity values. When the capacity of the battery falls below the highest of these threshold values, the mobile station sends a registration cancellation message to the serving system and then disables the transmit operation in order to conserve power. Other operations of the mobile station are systematically disabled if the battery capacity falls below one or more lower threshold values.

21 Claims, 7 Drawing Sheets

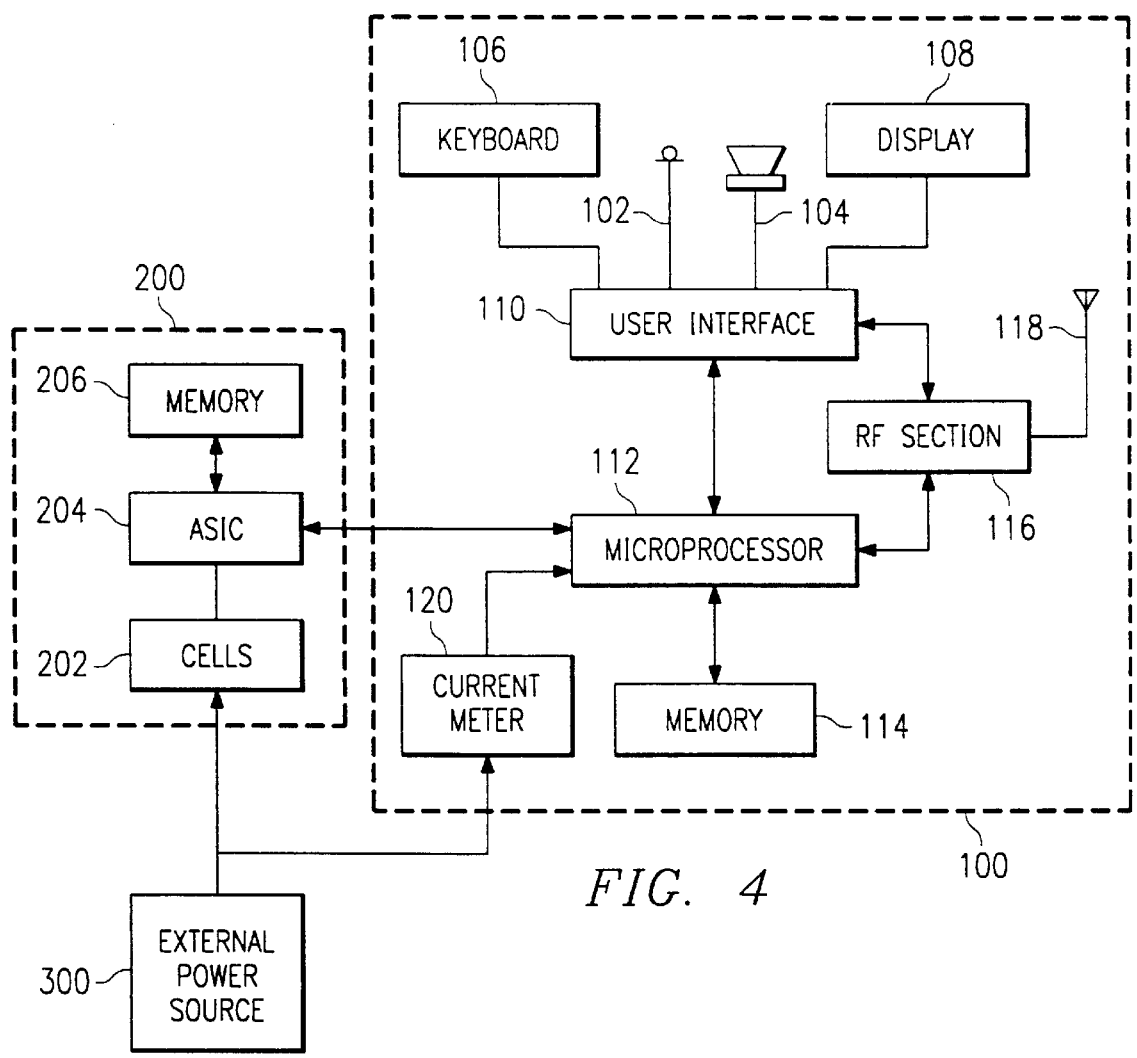
FIG. 4
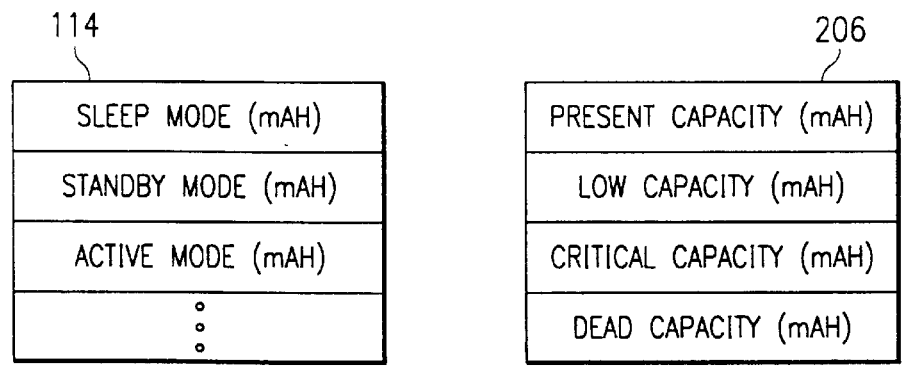
FIG. 5
FIG. 7

| COMMAND | COMMAND CODE | TYPE OF ACCESS | DESCRIPTION OF FUNCTION |
|---|---|---|---|
| MANUFACTURER ACCESS | 0X00 | READ/ WRITE | READS OR WRITES A WORD OF MANUFACTURER DEFINED DATA |
| REMAINING CAPACITY ALARM | 0X01 | READ/ WRITE | ALLOWS THE HOST TO SET OR READ THE THRESHOLD VALUE AT WHICH ALARM MESSAGES WILL BEGIN TO BE SENT OUT (REPORTED IN MINUTES) |
| REMAINING TIME ALARM | 0X02 | READ/ WRITE | SIMILAR TO REMAINING CAPACITY ALARM, BUT USES TIME INSTEAD OF CAPACITY |
| BATTERY MODE | 0X03 | READ/ WRITE | SETS AND REPORTS VARIOUS OPERATIONAL PARAMETERS |
| AT RATE | 0X04 | READ/ WRITE | USED IN COMBINATION WITH NEXT THREE FUNCTIONS TO DETERMINE CHARGE AND DISCHARGE VALUES |
| AT RATE TIME TO FULL | 0X05 | READ | ESTIMATE OF HOW LONG IT WILL TAKE TO CHARGE BATTERY GIVEN THE PREVIOUSLY DEFINED AT RATE VALUE |
| AT RATE TIME TO EMPTY | 0X06 | READ | ESTIMATE OF HOW LONG THE BATTERY CAN SUPPLY POWER BASED ON THE PREVIOUSLY DEFINED AT RATE VALUE |
| AT RATE OK | 0X07 | READ | RETURNS YES/NO ANSWER TO THE QUESTION OF "CAN BATTERY SUPPLY THE AT RATE CURRENT FOR 10 SECONDS?" |
| TEMPERATURE | 0X08 | READ | REPORTS THE BATTERY'S INTERNAL TEMPERATURE IN 0.1 °K INCREMENTS |
| VOLTAGE | 0X09 | READ | THE INSTANTANEOUS BATTERY VOLTAGE |
| CURRENT | 0X0A | READ | THE INSTANTANEOUS CURRENT BEING SUPPLIED FROM OR SENT TO THE BATTERY |
| AVERAGE CURRENT | 0X0B | READ | A ONE-MINUTE ROLLING AVERAGE OF CURRENT FROM BATTERY |
| MAX ERROR | 0X0C | READ | REPORTS THE ERROR MARGIN IN CHARGE/ DISCHARGE CALCULATIONS |
| RELATIVE STATE OF CHARGE | 0X0D | READ | PERCENT OF BATTERY CHARGE REMAINING |
| ABSOLUTE STATE OF CHARGE | 0X0E | READ | ESTIMATE OF REMAINING CAPACITY EXPRESSED AS A PERCENTAGE OF DESIGN CAPACITY |

FIG. 6A

| COMMAND | COMMAND CODE | TYPE OF ACCESS | DESCRIPTION OF FUNCTION |
|---|---|---|---|
| REMAINING CAPACITY | 0X0F | READ | REMAINING CHARGE BASED ON THE BATTERY MODE |
| FULL CHARGE CAPACITY | 0X10 | READ | ESTIMATED FULL CHARGE CAPACITY IN mAH OR 10 mWH INCREMENTS |
| RUN TIME TO EMPTY | 0X11 | READ | MINUTES OF OPERATION LEFT IN THE BATTERY |
| AVERAGE TIME TO EMPTY | 0X12 | READ | 1 MINUTE ROLLING AVERAGE OF THE ESTIMATED BATTERY LIFE |
| AVERAGE TIME TO FULL | 0X13 | READ | 1 MINUTE ROLLING AVERAGE OF ESTIMATED TIME TO FULLY CHARGE THE BATTERY |
| CHARGING CURRENT | 0X14 | READ | RETURNS THE DESIRED CHARGING RATE FOR THE BATTERY |
| CHARGING VOLTAGE | 0X15 | READ | RETURNS THE DESIRED CHARGING VOLTAGE FOR THE BATTERY |
| BATTERY STATUS | 0X16 | READ | PROVIDES THE COMPLETE STATUS OF THE BATTERY |
| CYCLE COUNT | 0X17 | READ | THE NUMBER OF CHARGE/DISCHARGE CYCLES THE BATTERY HAS UNDERGONE |
| DESIGN CAPACITY | 0X18 | READ | THE DESIGN CAPACITY OF THE BATTERY |
| DESIGN VOLTAGE | 0X19 | READ | THE DESIGN VOLTAGE OF THE BATTERY |
| SPECIFICATION INFO | 0X1A | READ | THE REVISION, VERSION AND SCALING DATA FOR THE BATTERY |
| MANUFACTURE DATE | 0X1B | READ | THE DATE THE BATTERY WAS MANUFACTURED |
| SERIAL NUMBER | 0X1C | READ | A NUMBER THAT UNIQUELY IDENTIFIES THE BATTERY |
| MANUFACTURER NAME | 0X20 | READ | ASCII STRING THAT REPORTS MANUFACTURER NAME |
| DEVICE NAME | 0X21 | READ | ASCII STRING THAT REPORTS THE BATTERY NAME |
| DEVICE CHEMISTRY | 0X22 | READ | ASCII STRING THAT REPORTS THE BATTERY CHEMISTRY |
| MANUFACTURER DATA | 0X23 | READ | MANUFACTURER SPECIFIC DATA |
| ALARM WARNING | 0X16 | WRITE | WORD DESCRIBING ALARM |

*FIG. 6B*

MOBILE STATION OPERATIONS MANAGEMENT BASED ON BATTERY CAPACITY

BACKGROUND OF THE INVENTION

1. Field of the Invention

The present invention relates to the supervision and control of battery power consumption by a mobile station in a wireless communications system, such as a cellular radio system and, more particularly, to the management of the operations of such a mobile station based on changes in its battery capacity.

2. Related Prior Art Systems

The prior art includes cellular radio systems which have been operating in the United States since the early 1980s, and providing telephone service to an ever growing subscriber base, presently estimated at over 20 million subscribers. Cellular telephone service operates much like the fixed, wireline telephone service in homes and offices, except that radio frequencies rather than telephone wires are used to connect telephone calls to and from the mobile subscribers. Each mobile subscriber is assigned a private (10 digit) directory telephone number and is billed based on the amount of "airtime" he or she spends talking on the cellular telephone each month. Many of the service features available to landline telephone users (e.g., call waiting, call forwarding, three-way calling, etc.) are also generally available to mobile subscribers.

The architecture for a typical cellular radio system is shown in FIG. 1. A geographical area (e.g., a metropolitan area) is divided into several smaller, contiguous radio coverage areas, called "cells," such as cells C1–C10. The cells C1–C10 are served by a corresponding group of fixed radio stations, called "base stations," B1–B10, each of which includes a plurality of RF channel units that operate on a subset of the RF channels assigned to the system, as well known in the art. For illustration purposes, the base stations B1–B10 are shown in FIG. 1 to be located at the center of the cells C1–C10, respectively, and are shown to be equipped with omni-directional antennas transmitting equally in all directions. However, the base stations B1–B10 may also be located near the periphery or otherwise away from the centers of the cells C1–C10, and may illuminate the cells C1–C10 with radio signals directionally (e.g., a base station may be equipped with three directional antennas each covering a 120 degrees sector).

The RF channels allocated to any given cell (or sector) may be reallocated to a distant cell in accordance with a frequency reuse plan as is well known in the art. In each cell (or sector), at least one RF channel is used to carry control or supervisory messages, and is called the "control" or "paging/access" channel. The other RF channels are used to carry voice conversations, and are called the "voice" or "speech" channels. The cellular telephone users (mobile subscribers) in the cells C1–C10 are provided with portable (hand-held), transportable (hand-carried) or mobile (car-mounted) telephone units, collectively referred to as "mobile stations," such as mobile stations M1–M5, each of which communicates with a nearby base station. Each of the mobile stations M1–M5 includes a controller (microprocessor) and a transmitter-receiver, as well known in the art.

With continuing reference to FIG. 1, the base stations B1–B10 are connected to and controlled by a mobile telephone switching office (MTSO) 20. The MTSO 20, in turn, is connected to a central office (not specifically shown in FIG. 1) in the landline (wireline) public switched telephone network (PSTN) 30, or to a similar facility such as an integrated system digital network (ISDN). The MTSO 20 switches calls between wireline and mobile subscribers, controls signalling to the mobile stations, compiles billing statistics, stores subscriber service profiles, and provides for the operation, maintenance and testing of the system.

Access to a cellular system by any of the mobile stations M1–M5 is controlled on the basis of a mobile identification number (MIN) and an electronic serial number (ESN) which are stored in the mobile station. The MIN is a digital representation of the 10-digit directory telephone number assigned to each mobile subscriber by the home system operator. The electronic serial number (ESN) is assigned by the manufacturer and permanently stored in the mobile station. The MIN/ESN pair is sent from the mobile station when originating a call and its validity is checked by the MTSO 20. If the MIN/ESN pair is determined to be invalid (e.g., if the ESN has been blacklisted because the mobile station was reported to be stolen), the system may deny access to the mobile station. The MIN is also sent from the system to the mobile station when alerting the mobile station of an incoming call.

When turned on (powered up), each of the mobile stations M1–M5 enters the idle state (standby mode) and tunes to and continuously monitors the strongest control channel (generally, the control channel of the cell in which the mobile station is located at that moment). When moving between cells while in the idle state, the mobile station will eventually "lose" radio connection on the control channel of the "old" cell and tune to the control channel of the "new" cell. The initial tuning to, and the change of, control channel are both accomplished automatically by scanning all the control channels in operation in the cellular system to find the "best" control channel (in the United States, there are 21 "dedicated" control channels in each cellular system which means that the mobile station has to scan a maximum number of 21 RF channels). When a control channel with good reception quality is found, the mobile station remains tuned to this channel until the quality deteriorates again. In this manner, the mobile station remains "in touch" with the system and may receive or initiate a telephone call through one of the base stations B1–B10 which is connected to the MTSO 20.

To detect incoming calls, the mobile station continuously monitors the current control channel to determine whether a page message addressed to it (i.e., containing its MIN) has been received. A page message will be sent to the mobile station, for example, when an ordinary (landline) subscriber calls the mobile subscriber. The call is directed from the PSTN 30 to the MTSO 20 where the dialed number is analyzed. If the dialed number is validated, the MTSO 20 requests some or all of the base stations B1–B10 to page the called mobile station throughout their corresponding cells C1–C10. Each of the base stations B1–B10 which receive the request from the MTSO 20 will then transmit over the control channel of the corresponding cell a page message containing the MIN of the called mobile station. Each of the idle mobile stations M1–M5 which is present in that cell will compare the MIN in the page message received over the control channel with the MIN stored in the mobile station. The called mobile station with the matching MIN will automatically transmit a page response over the control channel to the base station, which then forwards the page response to the MTSO 20. Upon receiving the page response, the MTSO 20 selects an available voice channel in the cell from which the page response was received (the MTSO 20 maintains an idle channel list for this purpose), and requests the base station in that cell to order the mobile station via the control channel to tune to the selected voice channel. A through-connection is established once the mobile station has tuned to the selected voice channel.

When, on the other hand, a mobile subscriber initiates a call (e.g., by dialing the telephone number of an ordinary subscriber and pressing the "send" button on the telephone handset in the mobile station), the dialed number and MIN/ESN pair for the mobile station are sent over the control channel to the base station and forwarded to the MTSO 20, which validates the mobile station, assigns a voice channel and establishes a through-connection for the conversation as described before. If the mobile station moves between cells while in the conversation state, the MTSO 20 will perform a "handoff" of the call from the old base station to the new base station. The MTSO 20 selects an available voice channel in the new cell and then orders the old base station to send to the mobile station on the current voice channel in the old cell a handoff message which informs the mobile station to tune to the selected voice channel in the new cell. The handoff message is sent in a "blank and burst" mode which causes a short but hardly noticeable break in the conversation. Upon receipt of the handoff message, the mobile station tunes to the new voice channel and a through-connection is established by the MTSO 20 via the new cell. The old voice channel in the old cell is marked idle in the MTSO 20 and may be used for another conversation. Furthermore, when travelling outside the system, the mobile station may be handed off to a cell in an adjacent system if there is a "roaming agreement" between the operators of the two systems.

In order to properly direct incoming calls to a mobile station which is moving around between different cells or systems, it is necessary to keep track of the location and activity of the mobile station. For this purpose, an autonomous registration process has been used in which the mobile station sends a registration message to the system upon entering a new system area or a new location area (i.e., a predefined group of cells in the system), or at predetermined intervals defined by the system operator. The system area and location area registration functions can be used to identify the current location of the mobile station so that it can be paged in its actual (or most likely) location rather than in all locations in the system. Each time the system receives a registration message from a mobile station in its area, it marks this mobile station as being active and present in its system area, or in the particular location area containing the cell of the base station which received the registration message, and then sends a registration confirmation message to this mobile station. The periodic registration function, on the other hand, is used to determine whether a mobile station is active (powered and within radio range) in a cellular system. Incoming calls to inactive mobile stations can be routed immediately to a recorded message (e.g., "The mobile customer you have called has turned off the mobile unit or travelled out of the service area.") without ever paging these mobile stations. This reduces the paging load and results in more efficient use of the limited control channel capacity.

The primary parameters that regulate the various mobile registration functions include the next registration (NXTREG) value which is stored in each mobile station and the system identification (SID), location area identification (LOCAID), registration identification (REGID) and registration increment (REGINCR) values which are broadcast by the system on the control channel of each cell. The SID is a digital number which uniquely identifies the serving cellular system. The LOCAID is a digital number which identifies a particular location area comprised of one or more cells in the system. The REGINCR defines the length of the periodic registration interval. The REGID is a 20-bit counter that is stepped by one unit in every REGID message transmitted to the mobile station. The NXTREG value indicates when periodic registration is due and is calculated internally in the mobile station by adding the current values of REGID and REGINCR. A mobile station will register with the serving system if either the SID or LOCAID received over the control channel is different from the corresponding value which it stored the last time it received a registration confirmation message (thus implying that the mobile station has travelled to a new system or location area, respectively), or if the REGID value received over the control channel is greater than or equal to the stored NXTREG (thus implying that a periodic registration is due). The mobile station updates the NXTREG value (with the sum of the current REGID and REGINCR values) upon the receipt of each registration confirmation message and, also, after every successful voice channel designation (i.e., call originations and receptions are treated like normal periodic registrations since by making or receiving a call a mobile station shows its activity and location).

The original cellular radio systems, as described above, used analog transmission methods, specifically frequency modulation (FM), and duplex (two-way) RF channels in accordance with the Advanced Mobile Phone Service (AMPS) standard. According to the AMPS standard, each control or voice channel between the base station and the mobile station uses a pair of separate frequencies consisting of a forward (downlink) frequency for transmission by the base station (reception by the mobile station) and a reverse (uplink) frequency for transmission by the mobile station (reception by the base station). The AMPS system, therefore, is a single-channel-per-carrier (SCPC) system allowing for only one voice circuit (telephone conversation) per RF channel. Different users are provided access to the same set of RF channels with each user being assigned a different RF channel (pair of frequencies) in a technique known as frequency division multiple access (FDMA). This original AMPS (analog) architecture forms the basis for an industry standard sponsored by the Electronics Industries Association (EIA) and the Telecommunication Industry Association (TIA), and known as EIA/TIA-553.

In the late 1980s, however, the cellular industry in the United States began migrating from analog to digital technology, motivated in large part by the need to address the steady growth in the subscriber population and the increasing demand on system capacity. It was recognized early on that the capacity improvements sought for the next generation cellular systems could be achieved by either "cell splitting" to provide more channels per subscribers in the specific areas where increased capacity is needed, or by the use of more advanced digital radio technology in those areas, or by a combination of both approaches. According to the first approach (cell splitting), by reducing the transmit power of the base station, the size of the corresponding cell (or cell radius) and, with it, the frequency reuse distance are reduced thereby resulting in more channels per geographic area (i.e., increased capacity). Additional benefits of a smaller cell include a longer "talk time" for the user since the mobile station will use substantially lower transmit power than in a larger cell and, consequently, its battery will not need to be recharged as often.

While cell splitting held the promise of improving both capacity and coverage for the growing mobile subscriber base, the actual capacity gains were limited by the use of the analog AMPS technology. It was commonly believed that the desired capacity gains, and indeed the effectiveness of the microcellular (cell splitting) concept in increasing capacity, can be maximized only by the use of digital technology. Thus, in an effort to go digital, the EIA/TIA developed a number of air interface standards which use digital voice encoding (analog-to-digital conversion and voice compression) and time division multiple access (TDMA) or code division multiple access (CDMA) techniques to multiply the number of voice circuits (conversations) per RF channel (i.e., to increase capacity). These standards include IS-54 (TDMA) and IS-95 (CDMA), both of which are "dual mode" standards in that they support the use of the original AMPS analog voice and control channels in addition to digital speech channels defined within the existing AMPS framework (so as to ease the transition from analog to digital and to allow the continued use of existing analog mobile stations). The dual-mode IS-54 standard, in particular, has become known as the digital AMPS (D-AMPS) standard. More recently, the EIA/TIA has developed a new specification for D-AMPS, which includes a digital control channel suitable for supporting public or private microcell operation, extended mobile station battery life, and enhanced end-user features. This new specification builds on the IS-54B standard (the current revision of IS-54), and it is known as IS-136. (All of the foregoing EIA/TIA standards are hereby incorporated herein by reference as may be necessary for a full understanding of these background developments. Copies of these standards may be obtained from the Electronics Industries Association, 2001 Pennsylvania Avenue, N.W., Washington, D.C. 20006).

According to IS-54B and as shown in FIG. 2, each RF channel is time division multiplexed (TDM) into a series of repeating time slots which are grouped into frames carrying from three to six digital speech channels (three to six telephone conversations) depending on the source rate of the speech coder used for each digital speech channel. Each frame on the RF channel comprises six equally sized time slots (1–6) and is 40 ms long (i.e, there are 25 frames per second). The speech coder for each digital traffic channel (DTCH) can operate at either full-rate or half-rate. A full-rate DTCH uses two equally spaced slots of the frame (i.e., slots 1 and 4, or slots 2 and 5, or slots 3 and 6). When operating at full-rate, the RF channel may be assigned to three users (A–C). Thus, for example, user A is assigned to slots 1 and 4, user B is assigned to slots 2 and 5, and user C is assigned to slots 3 and 6 of the frame as shown in FIG. 2. Each half-rate DTCH uses only one time slot of the frame. At half-rate, the RF channel may be assigned to six users (A–F) with each user being assigned to one of the six slots of the frame as also shown in FIG. 2. Thus, it can be seen that the DTCH as specified in the IS-54B standard allows for an increase in capacity of from three to six times that of the analog RF channel. At call set-up or handoff, a dual-mode mobile station will be assigned preferably to a digital traffic channel (DTCH) and, if none is available, it can be assigned to an analog voice channel (AVC). An analog-only mobile station, however, can only be assigned to an AVC.

The IS-136 standard specifies a digital control channel (DCCH) which is defined similarly to the digital traffic channel (DTCH) specified in IS-54B (i.e., on the same set of RF channels and with the same TDMA frame format and slot size). Referring back to FIG. 2, a half-rate DCCH would occupy one slot while a full-rate DCCH would occupy two slots out of the six slots in each 40 ms frame. The DCCH slots may then be mapped into different logical channels which are organized into a series of superframes. FIG. 3 shows the superframe structure of a full-rate DCCH according to IS-136 (in this example, the DCCH is defined over channel "A" in the TDMA frame). A superframe is defined in IS-136 as the collection of 32 consecutive time slots (640 ms) for a full-rate DCCH (16 slots for a half-rate DCCH). The logical channels specified in IS-136 include a broadcast control channel (BCCH) for carrying system-related information which is broadcast to all mobile stations, and a short message service, paging and access response channel (SPACH) for carrying information which is sent to specific mobile stations.

As shown in FIG. 3, the BCCH is divided into logical subchannels each of which is assigned an integer number of DCCH slots. The BCCH subchannels include a fast BCCH (F-BCCH), an extended BCCH (E-BCCH) and a point-to-multipoint short message service BCCH (S-BCCH). The F-BCCH is used to broadcast DCCH structure parameters and other parameters required for accessing the system (the first slot in a superframe is always assigned to the F-BCCH). The E-BCCH is used to broadcast information that is not as time-critical (for the operation of the mobile stations) as the information in the F-BCCH. The S-BCCH is used for the broadcast short message service (SMS) which can deliver alphanumeric messages of common interest to all mobile stations (e.g., traffic reports). The SPACH is also divided into logical subchannels each of which is assigned a given number of time slots on a fully dynamic basis (and, thus, these subchannels are not explicitly shown in FIG. 3). The SPACH subchannels include a point-to-point short message service channel (SMSCH), a paging channel (PCH) and an access response channel (ARCH). The SMSCH is used for carrying alphanumeric messages of interest to a specific mobile station (e.g., stock quotations). The PCH is used for carrying paging messages to different mobile stations (each mobile station is assigned to a predefined "paging frame class" which defines the periodicity with which it reads the PCH). The ARCH is used for responding to access requests from one of the mobile station (e.g., by delivering a channel assignment message to this mobile station).

An idle mobile station operating on the DCCH of FIG. 3 need only be "awake" (monitoring) during certain time slots (e.g., the F-BCCH or its assigned PCH slot) in each DCCH superframe and can enter "sleep mode" at all other times. While in sleep mode, the mobile station turns off most internal circuitry and saves battery power. Sleep mode operation reduces battery drain in the mobile station during idle mode and, therefore, increases both "standby time" and "talk time" for the user.

With the increase in standby time for an IS-136 mobile station, however, there is an increased risk that the user will leave a battery-powered mobile station turned on and idling in this mode for such a long period of time that the battery will discharge to the point that the simple action of generating a ring to the user (e.g., in response to a page message) will further discharge the battery to a level at which the mobile station will automatically turn off. This risk is further exacerbated in those situations where the mobile station must remain powered on for a period of time in order to accomplish a specific task. For example, a mobile station with a severely discharged battery may be connected to an external battery charger for rapid charging. In this case, the mobile station will turn on, begin the process of rapidly charging the battery and then attempt to register with the serving system. To transmit the registration message, the power amplifier (PA) in the transmitter will be turned on. As a result of turning on the PA, however, the battery voltage level will fall below the reset threshold and the mobile station then will turn off, thus ending the needed rapid charging of the battery.

In light of these problems, a mechanism is needed for the orderly shutdown of the various operations of the mobile station as its battery becomes increasingly discharged. It is further desirable that a discharged battery does not force the mobile station to automatically shut down merely because of the receipt of a page message. It is also desirable to avoid the premature shutdown of certain mobile station operations (e.g., rapid charging) when the battery is severely discharged. These goals are met by the present invention.

SUMMARY OF THE INVENTION

The present invention provides an apparatus and method for systematically scaling back the operations of a mobile station as its battery is continuously discharged by usage. According to the present invention, different mobile station operations are progressively disabled as the capacity of the battery falls below certain predetermined threshold levels.

In a preferred embodiment of the present invention, when the battery capacity falls below the highest of these threshold levels, thus implying that the mobile station is unable to transmit and only able to receive, the mobile station disables the transmit operation and enables, only the receive operation. Before disabling the transmit operation, however, the mobile station may send a registration cancellation message to the serving system so as to prevent the receipt of any page messages which could further discharge the battery.

Also, in the preferred embodiment, when the battery capacity falls below the lowest of the predetermined threshold levels, thus implying a severely discharged battery, the mobile station does not completely shut off all operations, but instead allows the continuation of a minimum subset of mobile station operations, including specifically the charging operation.

These and other aspects, objects and advantages of the present invention will become readily apparent from the accompanying drawings and the detailed description as set forth below.

BRIEF DESCRIPTION OF THE DRAWINGS

The present invention will be better understood and its numerous objects and advantages will become apparent to those skilled in the art by reference to the following detailed description taken in conjunction with the accompanying drawings in which:

FIG. 4 is a simplified block diagram of a mobile station and a smart battery interconnected in accordance with the present invention;

FIG. 5 is a block diagram of the memory of the mobile station of FIG. 4 configured in accordance with the present invention;

FIGS. 6A–B show a plurality of commands which the mobile station can send to the smart battery in accordance with the Duracell/Intel specification, a known industry standard;

FIG. 7 is a block diagram of the memory of a semi-smart battery configured in accordance with the present invention.

DETAILED DESCRIPTION

Figure 1:
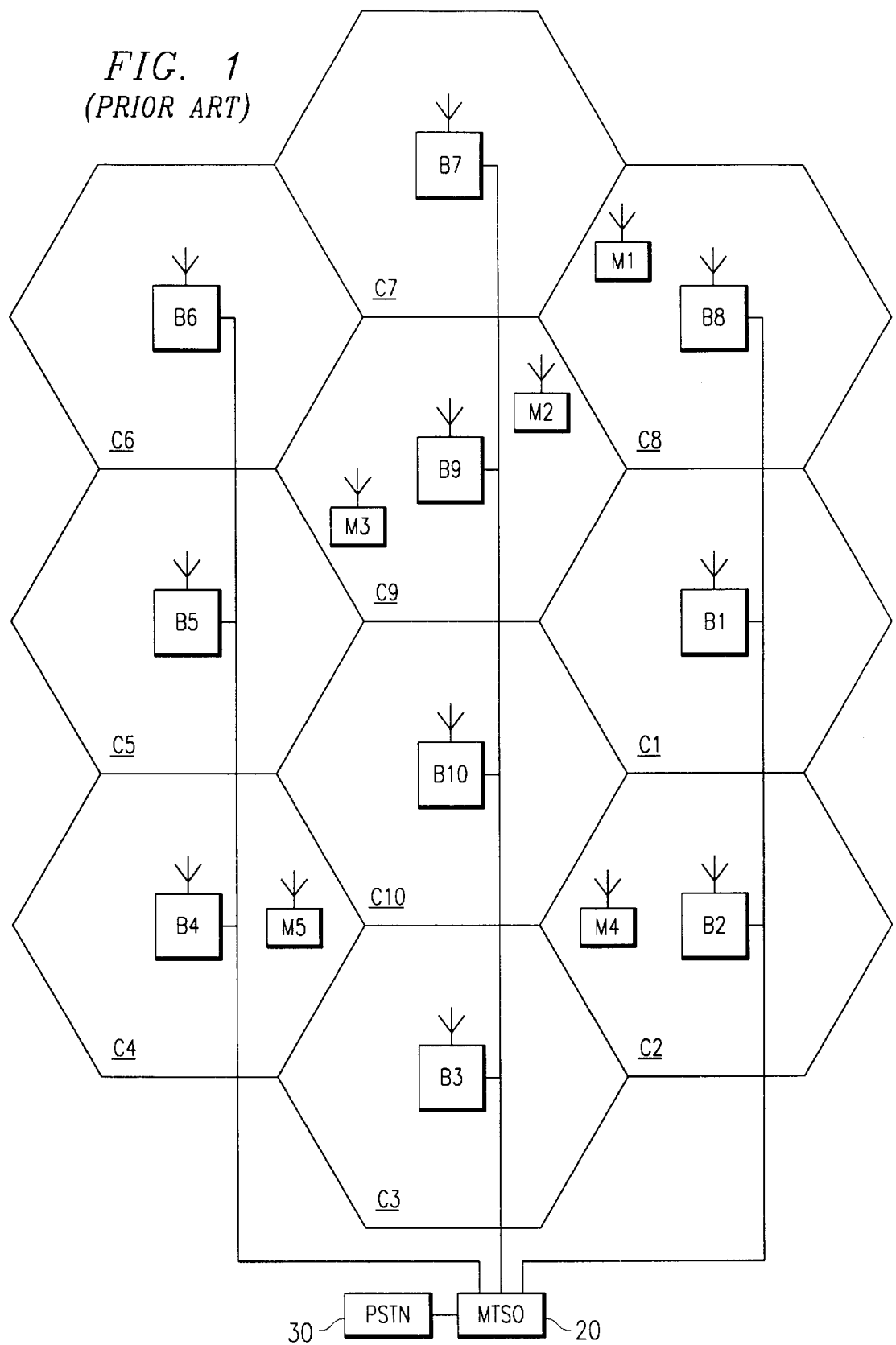
FIG. 1 shows the architecture of a conventional cellular radio system including a plurality of mobile stations and base stations communicating over a plurality of radio frequency (RF) channels.
Figure 2:
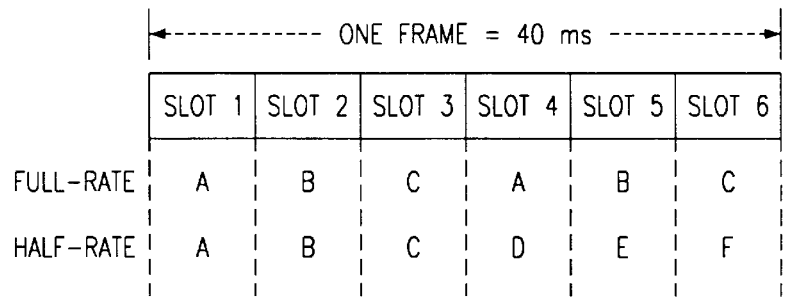
FIG. 2 shows the structure of a time division multiplexed (TDM) RF channel according to IS-54B, a known industry standard.

Referring next to FIG. 4, there is shown a simplified block diagram of a mobile station 100 and a smart battery 200 interconnected in accordance with the present invention. The mobile station 100 comprises a microphone 102, a loudspeaker 104, a keyboard or keypad 106, an alphanumeric or graphical display 108, a user interface 110, a microprocessor 112, a memory 114, a radio frequency (RF) section 116 and an antenna 118. The user interface 110 includes speech and data processing circuitry (not specifically shown) such as a codec for performing analog-to-digital (A/D) conversion of a transmit speech signal from the microphone 102 and digital-to-analog (D/A) conversion of a received speech signal destined for the loudspeaker 104. The user interface 110 further includes a digital signal processor (DSP) for performing gain/attenuation, filtering, compression/decompression, channel coding/decoding and any other desired processing (e.g., in accordance with IS-136) of speech and user or control data.

The RF section 116 includes RF processing circuitry (not specifically shown) such as an RF transmitter for modulating the transmit speech or data onto an analog carrier signal, up-converting the modulated signal to the selected channel frequency and then filtering, amplifying (in a power amplifier) and transmitting the signal through the antenna 116. The RF section 116 further includes an RF receiver for down-converting a modulated signal received through the antenna 118 into an intermediate frequency (IF) signal and then filtering and demodulating the IF signal for further processing in the DSP. The microprocessor 112 controls the overall operation of the mobile station 100 through software and other information which are stored in the memory 114, including, for example, software for each of the transmit and receive operations on the digital control channel (DCCH) and the digital traffic channel (DTCH) as specified in IS-136.

Figure 3:
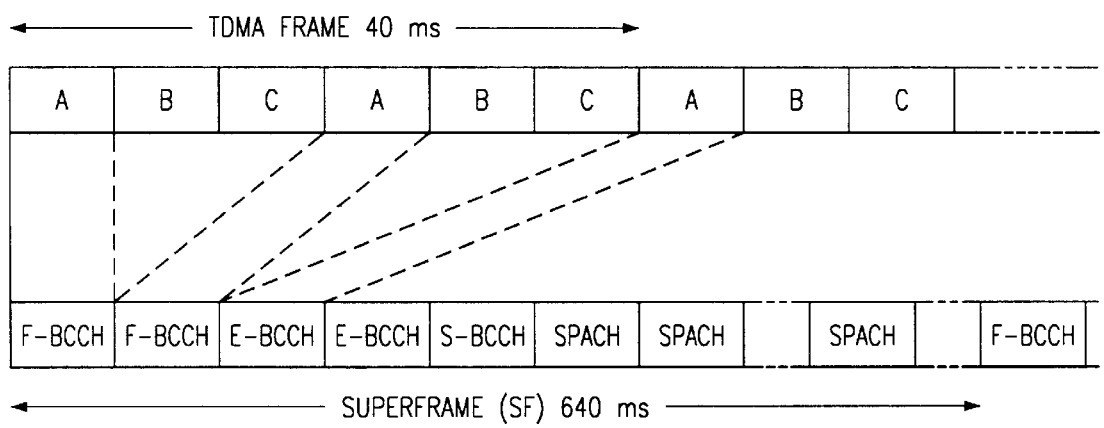
FIG. 3 shows the structure for a superframe of a digital control channel (DCCH) defined over the TDM RF channel shown in FIG. 2, as specified in IS-136, a known industry standard.

With a slotted transmit-receive architecture as provided in IS-136, for example, the mobile station 100, whether on the DCCH or DTCH, transmits and receives at different times (in different time slots). For purposes of the present invention, the mobile station 100 at any time (when it is turned on) may be considered to be either in the "standby" mode (transmit disabled and receive enabled), "sleep" mode (transmit disabled and receive disabled) or "active" mode (transmit enabled and receive disabled). In the standby mode, the mobile station may receive control data or a page or user message in specified time slots of a superframe over the DCCH as generally shown in FIG. 3. The microprocessor 112 will update the memory 114 with the received control data, and the user will be notified of any incoming page or user message through an audible alert generated in the loudspeaker 104 and/or a visual alert generated in the display 108. During other slots of the DCCH superframe, the mobile station switches to sleep mode and conserves battery current.

While in the standby mode, however, the user may initiate a call or send a user message by, for example, entering the telephone number or other data and then pressing a SEND key (not shown) on the keyboard 106. Furthermore, the user may respond to a received page message by, for example, pressing a FUNCTION key (not shown) on the keyboard 106. In any of these circumstances, the mobile station will enter the active mode and may transmit control messages or user data over the DCCH or speech data over the DTCH. It will be appreciated that the various modes consume battery current at different rates with the sleep mode (when most of the circuitry is turned off) consuming the least amount of current and the active mode (when the power amplifier is turned on) consuming the largest amount of current. In accordance with the present invention, the nominal current consumption rate in, for example, milli Amp Hour (mAH) for each of the three possible modes of operation can be measured (e.g., at the time of manufacture of the mobile station) and the corresponding values stored in the memory 114 as shown in FIG. 5.

With continuing reference to FIG. 4, the smart battery 200 includes a plurality of chemical cells 202 for generating electrical current, an application specific integrated circuit (ASIC) 204 for managing the operations of the battery 200 and a non-volatile memory 206 for storing information about the operation of the battery. The ASIC 204, for example, may be a commercially available battery identification ASIC such as model DS2435 sold by Dallas Semiconductors. Such an ASIC (when appropriately programmed) can, in response to a predefined command, report via its built-in serial interface the battery profile information, including battery chemistry (e.g., lithium, etc.), design capacity (at manufacture), instantaneous current input/output, conditions of operation (e.g., temperature) and charge and discharge history (e.g., number of times the battery has been charged and discharged). The memory 206, for example, may be an electrically erasable programmable read only memory (EEPROM) or a flash memory.

In the preferred embodiment of the present invention, the ASIC 204 communicates with the microprocessor 112 in accordance with the Smart Battery Data Specification which has been jointly developed by Duracell Corporation and Intel Corporation ("Duracell/Intel Smart Battery Data Specification," Revision 1.0, Feb. 15, 1995). As shown in FIGS. 6A–B, this data specification supports a plurality of different commands (messages) which a host device (here, the microprocessor 112) can send to a smart battery (here, the smart battery 200) in order to read data from, or write data to, the smart battery. For example, the host device can issue the command REMAINING CAPACITY ALARM to set or read a capacity threshold value below which the smart battery will begin to send intermittent alarm messages to the host device. Similarly, the host device can issue the command TEMPERATURE, VOLTAGE or CURRENT to retrieve the internal temperature, present voltage or input/output current, respectively, of the smart battery. The host device can also use the commands REMAINING CAPACITY and DESIGN CAPACITY to read the remaining capacity and design capacity, respectively, of the smart battery.

In other embodiments of the present invention and at different times, the mobile station 100 may be connected to a "semi-smart" battery or a "dumb" battery (instead of the smart battery 200). For purposes of the present description, the "semi-smart" battery is a battery which includes the cells 202 and the memory 206 but not the ASIC 204. In this case, the microprocessor 112 communicates directly with the memory 206 and can read from, or write data to, the memory 206 using conventional microprocessor-memory interface messages (rather than, for example, the set of messages defined in the Duracell/Intel Smart Battery Data Specification). The "dumb" battery, on the other hand, is a standard battery with no artificial intelligence, that is, it includes only the cells 202 but not the ASIC 204 or the memory 206. In this other case, the microprocessor 112 will be unable to exchange messages or information with the dumb battery.

The present invention allows the microprocessor 112 to control the operations of the mobile station 100 based on the present battery capacity as compared with one or more predetermined capacity levels below which certain mobile station operations should be progressively reduced or disabled. For a smart battery according to the Duracell/Intel specification, the microprocessor 112 can obtain the present capacity value directly from the smart battery 200 by using the REMAINING CAPACITY message (see FIG. 6B). For a semi-smart battery, however, the battery may be initially conditioned, that is, completely discharged and then fully recharged from an external power source 300 (FIG. 4), with the rate of charge (capacity increase) being measured by the microprocessor 112 using, for example, a current shunt from the external power source 300 to a current meter 120 in the mobile station 100 (FIG. 4). In this manner, the microprocessor 112 can use the measurements recorded by the current meter 120 to obtain a reliable starting present capacity value (for the fully charged semi-smart battery) which will be stored in the memory 206 of the semi-smart battery as shown in FIG. 7. Thereafter, as current is consumed from the semi-smart battery, the microprocessor 112 will periodically update the present capacity value in the memory 206 to reflect the rate of discharge (capacity decrease) as the mobile station 100 operates in one of the three possible modes. For example, every 500 ms the microprocessor 112 can subtract from the present capacity value the amount of current consumption during the last 500 ms as represented by the normalized value $500 \times R/3{,}600{,}000$, where R is the current consumption rate in mAH for the present mode of operation as shown in FIG. 5. On the other hand, when the semi-smart battery is recharged from the external power source 300, the microprocessor 112 will monitor the capacity increase with the current meter 120 and reinitialize the present capacity value as described above.

In practice, certain operating conditions may introduce an error factor in the calculation of present capacity value strictly on the basis of nominal current consumption data. As well known in the art, for example, battery capacity decreases as operating temperature, internal resistance (which is a function of battery chemistry) or the number of charge/discharge cycles increases, and, hence, the present capacity value may have to be downwardly revised under these circumstances. On the other hand, the present capacity value may have to be upwardly revised if the battery has been recently conditioned to rejuvenate the usable capacity of the battery after several incomplete discharge/charge cycles. As indicated in FIGS. 6A–B, the smart battery envisioned by the Duracell/Intel specification takes such considerations into account as evidenced, for example, by the TEMPERATURE, CYCLE COUNT, DEVICE CHEMISTRY, BATTERY STATUS (e.g., conditioning status) and MAXIMUM ERROR messages. For a semi-smart battery, however, the microprocessor 112 must calculate the present capacity value and account for operating conditions such as temperature, resistance or charge/discharge cycle count, which are not usually reported by the battery. Nevertheless, a measure or estimate of one or more of these conditions may be available to the microprocessor 112 when calculating the present capacity of a semi-smart battery. For example, the ambient temperature value may be obtained from an ambient temperature A/D sensor in the mobile station 100, and the battery resistance value may be provided by the manufacturer of the battery in the memory 206, which can be accessed by the microprocessor 112.

In the preferred embodiment of the present invention, three different threshold capacity values are defined in the following descending order: low capacity, critical capacity and dead capacity (hereinafter collectively referred to as the "alarm" capacity values). The first value, low capacity, designates the minimum capacity level for maintaining normal mobile station operations. The second value, critical capacity, designates the capacity level at which certain high current-consuming operations or components such the power amplifier, display and lighting subsystems or the temperature control oscillator (TCXO) can no longer be sustained. Finally, the third value, dead capacity, designates the capacity level at which almost no mobile station operations (even low current consumers) can be supported. At this level, the charging operation may be the only operation which is allowed to proceed.

In practice, the initial set of alarm values may be selected during design and testing of the mobile station 100 and stored in the memory 114. However, when operating in the field, the microprocessor 112 may adjust the alarm values based, for example, on the operating temperature, internal resistance, charge/discharge cycle count or conditioning status of the battery 200. Thus, for example, the alarm values may be upwardly revised by the microprocessor 112 as the operating temperature, internal resistance or cycle count of the battery increases. For a smart battery according to the Duracell/Intel specification, the microprocessor 112 can obtain the relevant temperature, resistance or cycle count values directly or indirectly from the smart battery 200 by using the TEMPERATURE, DEVICE CHEMISTRY or CYCLE COUNT messages, respectively (see FIGS. 6A–B). For a semi-smart battery, however, the ambient temperature value may be obtained from an ambient temperature A/D sensor in the mobile station 100, and the battery resistance value may be provided by the manufacturer of the battery in the memory 206, as discussed previously.

In general, the alarm values (e.g., in mAH) selected by the microprocessor 112 can be written into the memory 206 of a smart or semi-smart battery, as shown in FIG. 7, so that they are associated with a particular battery having a particular profile (and can be updated, if necessary, based on that battery's own operating conditions). The microprocessor 112 can then periodically compare the present capacity value to the stored alarm values in order to determine whether the present capacity value has fallen below any of three alarm values. However, within the framework of the Duracell/Intel specification, only one alarm value may be used for generating alarm messages at any one time. Thus, if a smart battery according to that specification is used with the present invention, the low capacity value must be written first to be replaced by the critical capacity value when the present capacity value falls beyond the low capacity value. Similarly, for such a smart battery, the critical capacity value is replaced with the dead capacity value when the present capacity value falls beyond the critical capacity value. On the other hand, when such a smart battery is recharged, the starting alarm value must once again be set to the low capacity value.

In the preferred embodiment of the present invention, the microprocessor 112 takes one or more selected actions when the present capacity value reaches the low, critical and dead capacity values, respectively. Thus, if the present capacity value falls below the low capacity value, the microprocessor 112 will generate an audible and/or visual alarm to the user via the loudspeaker 104 and/or the display 108. The alarm would warn the user of a low battery condition and optionally provide the user with an indication that, at this battery level, ongoing telephone calls or other activities of interest can be only sustained for an enumerated period of time. Furthermore, once the low capacity value is reached, the microprocessor 112 immediately sends a registration cancellation message to the serving base station so as to prevent the system from directing any incoming calls to the mobile station 100. This avoids the risk of the mobile station 100 receiving and processing a page message from the system and, in the process, discharging the battery 200 to the point where all desired operations will cease. The registration cancellation message also allows the system to mark the mobile station 100 as being presently unavailable for telephone calls and, thus, incoming calls for the mobile station 100 can be immediately redirected to a prerecorded message. After sending the registration cancellation message, the mobile station 100 will disable the transmit operation. In this state, however, the mobile station 100 can continue to receive from the system certain services such as the short message service (SMS) defined in IS-136.

If the present capacity value thereafter should fall below the critical capacity value, the microprocessor 112 generates a more urgent audible and/or visual warning to the user via the loudspeaker 104 and/or the display 108. This warning may indicate to the user that mobile station operations would be terminated within a certain period of time. In this state, call originations and receptions by the mobile station would continue to be disallowed and other operations allowed or disallowed depending on their current consumption requirements as compared with the available capacity. If the present capacity value then should fall below the dead capacity value, the microprocessor 112 will terminate all remaining mobile station operations other than the charging operation. In the preferred embodiment, the dead capacity value is selected so as to prevent any permanent damage to the cells 202 of the battery 200 if its capacity was to fall below this level (such as the type of damage which would occur if a lithium-type battery was severely discharged).

Figure 8A:
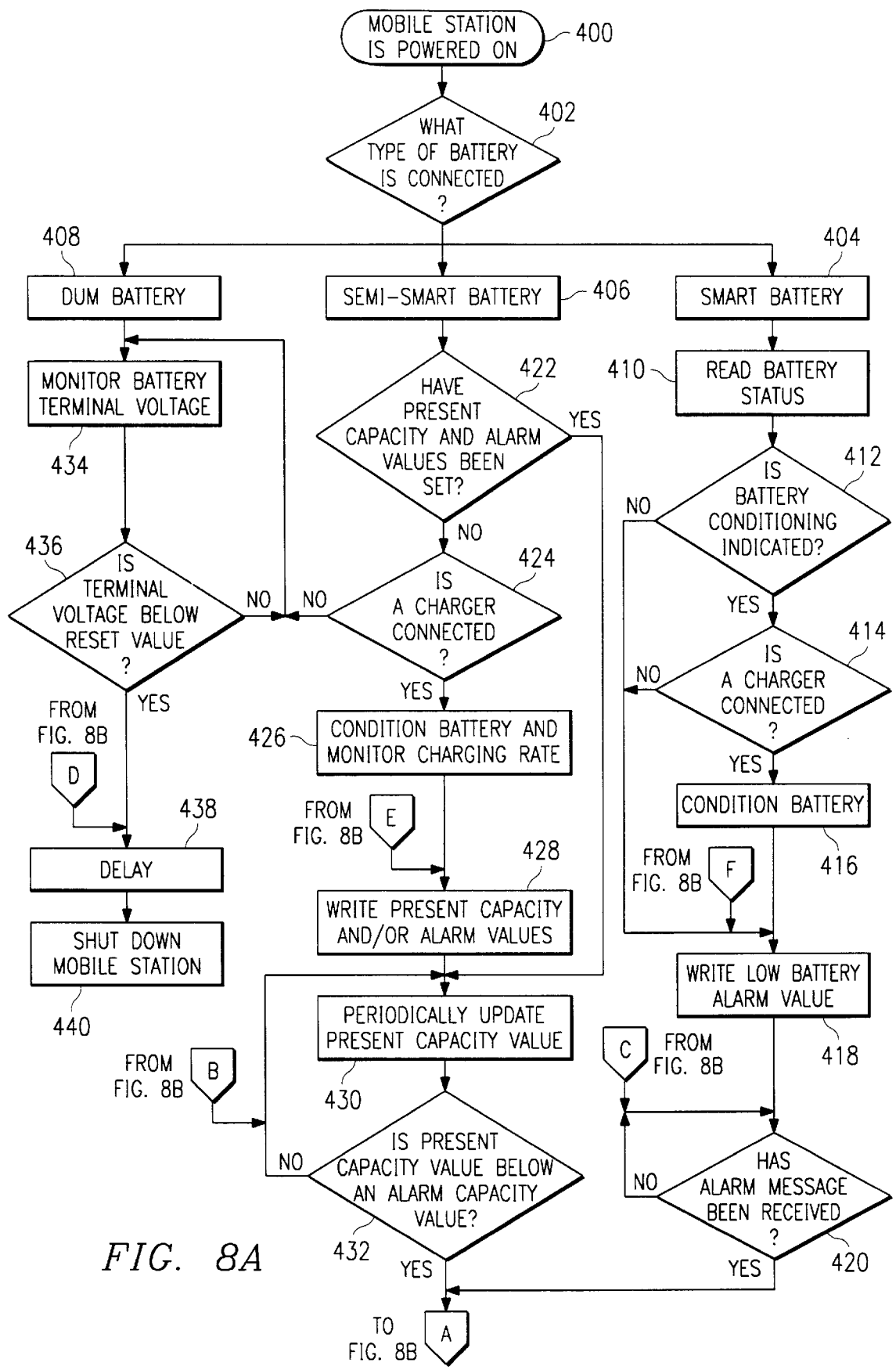
FIGS. 8A–B are a flow chart of the power management steps executed by the microprocessor in the mobile station in accordance with the present invention.
Figure 8B:
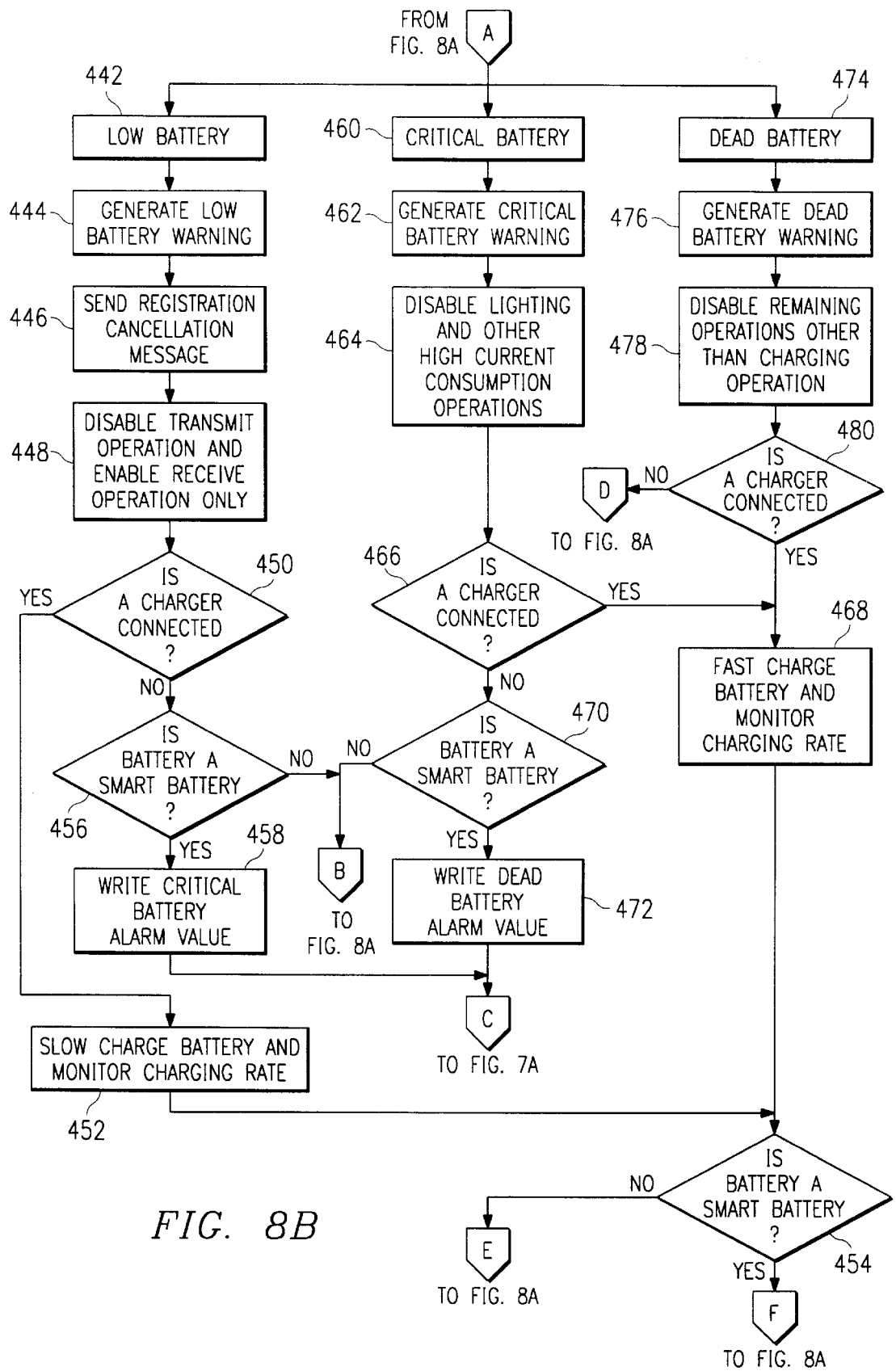

Referring next to FIGS. 8A–B, there is shown an exemplary flowchart of the battery management steps executed by the microprocessor 112 in accordance with the present invention whenever a battery is connected to the mobile station 100. The battery management process begins at block 400 where the mobile station 100 is turned on. At block 402 the microprocessor 112 determines the type of battery, that is, whether the battery is a dumb battery, a semi-smart battery or a smart battery. For this purpose, the microprocessor 112 will attempt to communicate with the battery using an initialization protocol designed for a smart battery (such a protocol is specified in the Duracell/Intel specification, for example). If a reply in accordance with that protocol is received, the microprocessor 112 will assume that the battery is a smart battery and will thus proceed from block 404. Otherwise, the microprocessor will next attempt to read the memory 206. If this attempt is successful, the microprocessor 112 will assume that the battery is a semi-smart battery and will thus proceed from block 406. On the other hand, if the microprocessor 112 cannot establish communication with the battery or read the memory 206, it will assume that the battery is a dumb battery and thus proceed from block 408.

Assuming that the battery is a smart battery, and further assuming for purposes of illustration that the smart battery complies with the Duracell/Intel specification, the microprocessor 112 proceeds from block 404 to blocks 410 and 412 where it reads the battery status and determines whether it indicates battery conditioning. If battery conditioning is indicated, the microprocessor 112 determines at block 414 whether a charger is connected to the battery. If a charger is connected, the microprocessor 112 orders conditioning of the battery at block 416. After conditioning the battery, or if battery conditioning was not indicated or could not be performed because a charger was not connected, the microprocessor 112 proceeds to block 418 and writes the low battery alarm value in the memory 206 of the smart battery. Thereafter, the microprocessor 112 waits for an alarm message which will be automatically generated by the smart battery when its remaining capacity falls below the low battery alarm value.

Returning to decision block 402 and assuming that the battery was classified not as a smart battery but as a semi-smart battery, the microprocessor 112 proceeds form block 406 to block 422 and determines whether the present capacity and alarm values were previously set in the memory 206 (as shown in FIG. 7). If the semi-smart battery is new, for example, the memory 206 would contain the value zero (or some other arbitrary number designating a null value) in each of the memory locations corresponding to the present capacity and alarm values. The microprocessor 112, therefore, will not be able to determine the present capacity of the battery by simply reading the memory 206. In order to initialize the memory 206 with a starting present capacity value, the microprocessor 112 determines at block 424 whether a charger is available for conditioning the battery. If a charger is available, the microprocessor 112 triggers battery conditioning and measures the charging rate at block 426 so as to obtain the present capacity value after battery conditioning is completed. At block 428, the microprocessor 112 writes that present capacity value along with the low battery, critical battery and dead battery alarm values to the memory 206. Thereafter, at blocks 430 and 432, the microprocessor 112 periodically updates the present capacity value by subtracting the incremental capacity loss based on the current consumption rate for the present mode of operation of the mobile station 100 (and any relevant operating conditions), while also checking whether the present capacity value has fallen below the alarm capacity value stored in the memory 206 of the semi-smart battery.

Returning to decision blocks 402 and 424, if the battery was classified as a dumb battery or if it was classified as a semi-smart battery but a charger was not available for conditioning the battery and initializing the present capacity value, the microprocessor 112 defaults to the conventional method of battery management by monitoring the battery terminal voltage, checking whether it has fallen below a predetermined reset value and, if so, terminating all operations of the mobile station after a predetermined delay interval, all as shown in blocks 434–440. As described further below, however, the present invention contemplates a far more sophisticated arrangement for controlling mobile station operations when the battery is either a smart battery or a semi-smart battery (this arrangement may be used in lieu of, or in addition to, the conventional method of checking battery terminal voltage).

According to the present invention, for a smart battery or a semi-smart battery and as shown in decision blocks 420 and 430–432, respectively, the microprocessor 112 is regularly determining whether the present capacity value has reached the low capacity alarm value. If, at any time, the microprocessor 112 detects a low battery condition, it proceeds from block 442 to block 444 where it generates a low battery warning to the user through the loudspeaker 104 and/or the display 108. At block 446, the microprocessor 112 sends a registration cancellation message via the RF section 116 to the serving base station. Then at block 448, the microprocessor 112 disables the transmit operation and enables only the receive operation in the RF section 116. Since the battery is running low, the microprocessor 112 next determines at block 450 whether an external power source is available to recharge the battery. If a charger is available, the microprocessor 112 initiates a slow charging of the battery while monitoring the charging rate (for a semi-smart battery) at block 452. Once charging has been completed, and depending on whether the battery is a smart battery or a semi-smart battery as shown at block 454, the microprocessor 112 rewrites the low battery alarm value (for a smart battery) or the present capacity value (for a semi-smart battery) and returns to monitoring for the next occurrence of a low battery alarm condition. On the other hand, if a charger is not available at block 450, and depending on whether the battery is a smart battery or a semi-smart battery as shown at block 456, the microprocessor 112 will return to updating the present capacity value (for a semi-smart battery) or will proceed to block 458 to write the critical battery alarm value (for a smart battery). The microprocessor 112 will now check for a receipt of a critical battery alarm message (for a smart battery) or for a decline in the present capacity value below the critical capacity value (for a semi-smart battery).

When the microprocessor 112 detects a critical battery condition, it proceeds from block 460 to block 462 where it generates a critical battery warning to the user through the loudspeaker 104 and/or the display 108. At block 464, the microprocessor 112 disables a number of operations which draw a high amount of electrical current, such as the lighting and display operations. At block 466, the microprocessor 112 determines whether an external power source is available to recharge the battery. If a charger is available, the microprocessor 112 initiates a fast charging of the battery while monitoring the charging rate (for a semi-smart battery) at block 468. A fast charging procedure is used here, instead of a slow charging procedure, because the battery capacity is at the critical level. It will be readily appreciated, however, that it is possible to fast charge the battery until the present capacity value reaches, for example, the low capacity value (or some other predetermined minimum operational value) at which time the microprocessor 112 can switch to a slow charging of the battery if desired. Once charging has been completed, and depending on whether the battery is a smart battery or a semi-smart battery as shown at block 454, the microprocessor 112 rewrites the low battery alarm value (for a smart battery) or the present capacity value (for a semi-smart battery) and returns to monitoring for a low battery alarm condition. On the other hand, if a charger is not available at block 466, and depending on whether the battery is a smart battery or a semi-smart battery as shown at block 470, the microprocessor 112 will return to updating the present capacity value (for a semi-smart battery) or will proceed to block 472 to write the dead battery alarm value (for a smart battery). The microprocessor 112 will now check for a receipt of a dead battery alarm message (for a smart battery) or for a decline in the present capacity value below the dead capacity value (for a semi-smart battery).

When the microprocessor 112 detects a dead battery condition, it proceeds from block 474 to block 476 where it generates a dead battery warning to the user through the loudspeaker 104 and/or the display 108. At block 478, the microprocessor 112 disables all or substantially all remaining mobile station operations other than the charging operation. Next, at block 480, the microprocessor 112 determines whether an external power source is available to recharge the battery. If a charger is available, the microprocessor 112 proceeds to block 468 and initiates a fast charging of the battery while also monitoring the charging rate (for a semi-smart battery). Once charging has been completed, and depending on whether the battery is a smart battery or a semi-smart battery as shown at block 454, the microprocessor 112 rewrites the low battery alarm value (for a smart battery) or the present capacity value (for a semi-smart battery) and returns to monitoring for a low battery alarm condition. On the other hand, if a charger is not available at block 480, and given that the battery is at dead capacity level, the microprocessor 112 jumps to blocks 438–440 and terminates all mobile station operations after a predetermined delay interval.

It can thus be seen that, generally speaking, the present invention provides for the selective reduction of mobile station operations in successive stages based on dwindling battery capacity. Those skilled in the art will readily recognize that many modifications and variations may be made to the embodiments of the present invention disclosed herein without substantially departing from the spirit and scope of the present invention. For example, when the mobile station 100 is connected to a smart battery as defined in the Duracell/Intel specification, the microprocessor 112 can actively monitor the capacity of the battery by periodically issuing the REMAINING CAPACITY (or RUN TIME TO EMPTY) command and then comparing the returned value with the preset alarm values, rather than using the REMAINING CAPACITY ALARM (or REMAINING TIME ALARM) command and then waiting for an alarm message as shown in FIG. 8. Accordingly, the form of the invention disclosed herein is exemplary, and is not intended as a limitation on the scope of the invention as defined in the following claims.

I claim:

1. In a communications system comprising a base station in communication with a mobile station, said mobile station being powered by a battery, a method for controlling the operations of said mobile station based on the capacity of said battery, the method comprising the steps of:

selecting at least one threshold capacity value for said battery;

monitoring the capacity of said battery to determine whether it has fallen below said at least one threshold capacity value; and when the capacity of said battery falls below said at least one threshold capacity value:

generating a perceptible warning in said mobile station; and sending a registration cancellation message from said mobile station to said base station.

2. The method of claim 1 further comprising the step of disabling the transmit operation of said mobile station when the capacity of said battery falls below said at least one threshold capacity value.

3. The method of claim 1 further comprising the step of charging said battery, if a charger is connected to the battery, when the capacity of said battery falls below said at least one threshold capacity value.

4. The method of claim 1 wherein:

said battery is a smart battery which is configured to send an alarm message to said mobile station when the capacity of said smart battery falls below said at least one threshold value; and said monitoring step comprises determining whether said mobile station has received said alarm message.

5. The method of claim 1 wherein:

said battery is a smart battery which reports its capacity in response to a predefined command; and said monitoring step comprises periodically issuing said command to said smart battery.

6. The method of claim 1 wherein said monitoring step comprises periodically calculating the capacity of said battery based on the electrical current consumption rate of said mobile station.

7. The method of claim 1 wherein said perceptible warning is an audible warning through a loudspeaker in said mobile station.

8. The method of claim 1 wherein said perceptible warning is a visual warning through a display in said mobile station.

9. The method of claim 1 wherein said at least one threshold capacity value comprises, in descending order, a low battery threshold value, a critical battery threshold value and a dead battery threshold value, and wherein the method comprises the steps of:

generating said perceptible warning when the capacity of said battery falls below any of said low battery, critical battery or dead battery threshold values;

sending said registration cancellation message when the capacity of said battery falls below said low battery threshold value;

disabling at least the lighting operation of said mobile station when the capacity of said battery falls below said critical battery threshold value; and disabling substantially all remaining operations of said mobile station, other than the charging operation, when the capacity of said battery falls below said dead battery threshold value.

10. The method of claim 9 further comprising the step of charging said battery, if a charger is connected to the battery, when the capacity of said battery falls below any of said low battery, critical battery or dead battery threshold values.

11. The method of claim 9 further comprising the step of disabling the transmit operation of said mobile station after sending said registration cancellation message when the capacity of said battery falls below said low battery threshold value.

12. A mobile station powered by a battery and communicating with a base station, the mobile station comprising:

a transmitter for transmitting messages to said base station;

a receiver for receiving messages from said base station;

means for monitoring the capacity of said battery to determine whether it has fallen below at least one predetermined threshold value; and means for sending a registration cancellation message to said base station and for disabling said transmitter and enabling said receiver when the capacity of said battery falls below said at least one threshold capacity value.

13. The mobile station of claim 12 further comprising means for generating a perceptible warning in said mobile station when the capacity of said battery falls below said at least one threshold capacity value.

14. The mobile station of claim 13 wherein said means for generating a perceptible warning comprises a loudspeaker.

15. The mobile station of claim 13 wherein said means for generating a perceptible warning comprises a display.

16. The mobile station of claim 12 wherein said battery is charged, if a charger is connected to said battery, when the capacity of said battery falls below said at least one threshold capacity value.

17. The mobile station of claim 12 wherein:

said battery is a smart battery which is configured to send an alarm message to said mobile station when the capacity of said smart battery falls below said at least one threshold value; and said monitoring means comprises means for determining whether said mobile station has received said alarm message.

18. The mobile station of claim 12 wherein:

said battery is a smart battery which reports its capacity in response to a predefined command; and said monitoring means comprises means for periodically issuing said command to said smart battery.

19. The mobile station of claim 12 wherein said monitoring means comprises means for periodically calculating the capacity of said battery based on the electrical current consumption rate of said mobile station.

20. The mobile station of claim 12 wherein said at least one threshold capacity value comprises, in descending order, a low battery threshold value, a critical battery threshold value and a dead battery threshold value, and wherein said mobile station:

generates a perceptible warning when the capacity of said battery falls below any of said low battery, critical battery or dead battery threshold values;

sends a registration cancellation message and then disables said transmitter and enables said receiver when the capacity of said battery falls below said low battery threshold value;

disables at least its lighting operation when the capacity of said battery falls below said critical battery threshold value; and disables substantially all of its remaining operations, other than the charging operation, when the capacity of said battery falls below said dead battery threshold value.

21. The mobile station of claim 20 wherein said battery is charged, if a charger is connected to said battery, when the capacity of said battery falls below any of said low battery, critical battery or dead battery threshold values.

* * * * *